United States Patent [19]
Smith

[11] Patent Number: 5,253,431
[45] Date of Patent: Oct. 19, 1993

[54] LINEAR MEASUREMENT DEVICE

[76] Inventor: Quintin R. Smith, 531 E. Second St., Port Clinton, Ohio 43452

[21] Appl. No.: 948,497

[22] Filed: Sep. 22, 1992

[51] Int. Cl.$^5$ .......................... G01B 3/20; G01B 5/14; G01B 7/14
[52] U.S. Cl. .......................................... 33/810; 33/784
[58] Field of Search ................ 33/784, 810, 811, 812, 33/796, 795, 783

[56] References Cited

U.S. PATENT DOCUMENTS

| | | | |
|---|---|---|---|
| 2,467,263 | 4/1949 | Krisanda | 33/810 |
| 2,677,186 | 5/1954 | Sorensen | 33/812 |
| 2,693,033 | 11/1954 | Acker, Jr. et al. | |
| 3,273,248 | 9/1966 | Halverstadt | 33/796 |
| 3,289,307 | 12/1966 | Kelly | |
| 3,805,397 | 4/1974 | Wilamowski | |
| 4,229,883 | 10/1980 | Kobashi | |
| 4,566,199 | 1/1986 | Gruhler et al. | |
| 4,612,656 | 9/1986 | Suzuki et al. | 33/784 |
| 4,731,931 | 3/1988 | Goodman et al. | 33/796 |
| 4,741,108 | 5/1988 | Cohen | 33/810 |
| 4,972,603 | 11/1990 | Meyer | 33/810 |

Primary Examiner—William A. Cuchlinski, Jr.
Assistant Examiner—C. W. Fulton
Attorney, Agent, or Firm—Willian Brinks Olds Hofer Gilson & Lione

[57] ABSTRACT

A linear measurement device having a digital readout provides rapid and direct measurement of center-to-center, center-to-edge and edge-to-edge distances. The device includes an endpiece assembly secured to an elongate beam. A slider assembly is disposed on the beam for bi-directional translation therealong and includes an electronic distance measuring and readout assembly. The endpiece assembly and the slider assembly each include portions of three sets of locating structures which cooperate to position the slider relative to the beam to effect linear measurement. A first set of locating structures comprises a pair of cones for locating the centers of circles and measuring therebetween. The second set of locating structures comprises a cone and a pin for measuring the distance of the center of a circle from an edge. The third set of locating structures includes two pairs of pins disposed in parallel spaced relationship for making edge-to-edge and diagonal measurements.

22 Claims, 4 Drawing Sheets

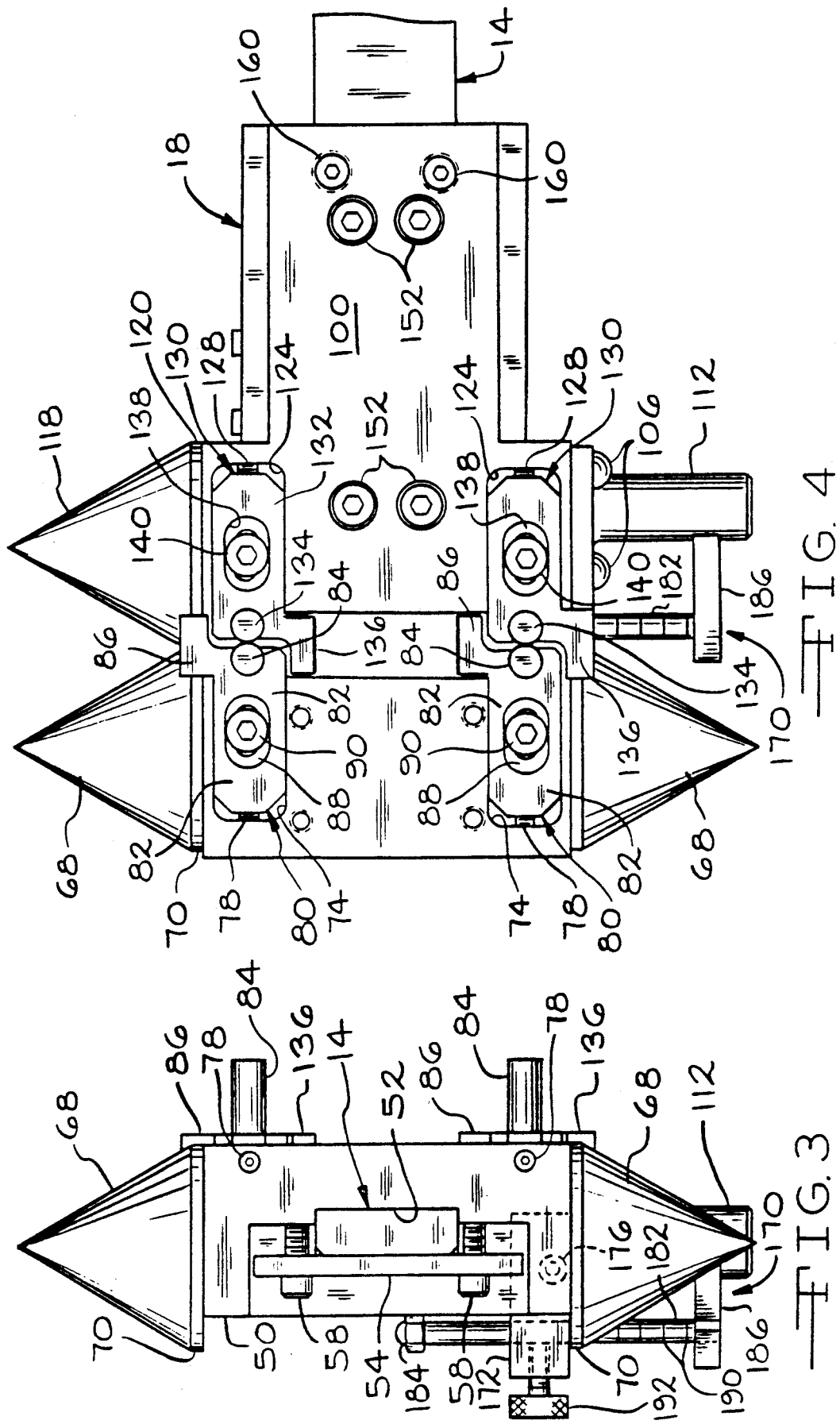

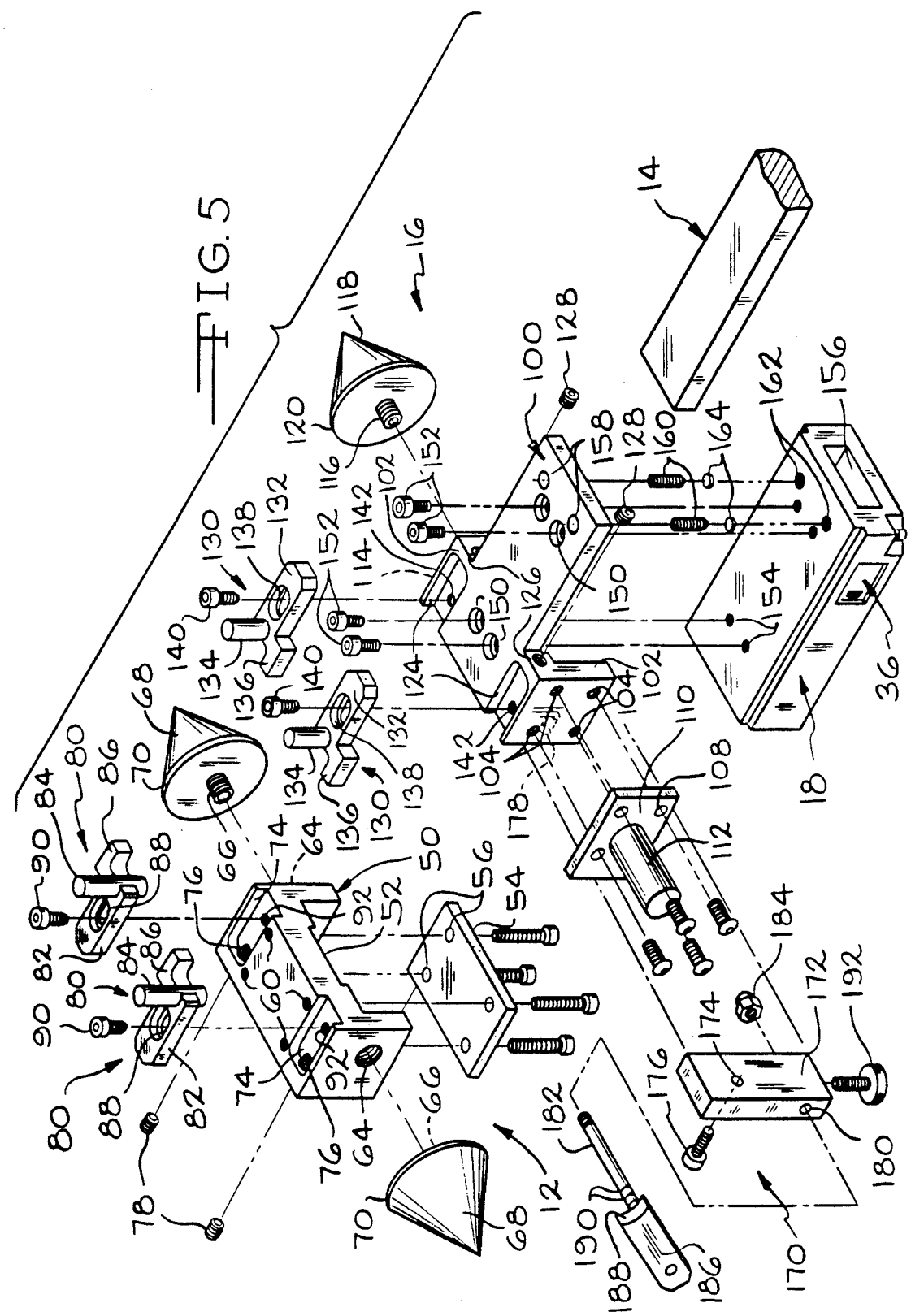

LINEAR MEASUREMENT DEVICE

BACKGROUND OF THE INVENTION

The invention relates generally to measuring devices and more specifically to a device having a digital readout and three sets of specially adapted components to make center-to-center, center-to-edge and edge-to-edge measurements.

While quality control is the contemporary focus of manufacturing, obtaining accurate measurements of components is clearly the focus of quality control. Stated somewhat differently, without the proper measurement equipment and techniques, the expectation of quality goods may be nothing more than an expectation.

In manufacturing facilities, machine shops and repair depots, linear measurements are generally accomplished with micrometers, scales, calipers and vernier calipers. These devices typically provide accurate measurements between two flat or curved surfaces. When the component or particular feature of a component to be measured is more complex, adaptations of the foregoing delineated devices may be utilized. For example, U.S. Pat. No. 2,693,033 teaches several basic mechanical devices which utilize either a pair of cones, one of which is slidable along a linear scale, or a slidable cone and fixed edge to measure either center-to-center or center-to-edge distances. U.S. Pat. No. 3,289,307 teaches a similar distance gauge wherein a first cone affixed to one end of a scale and a second cone and vernier which are slidable along the scale provides center-to-center distance measurement. Portions of the center measuring cones nest to facilitate measurement of small center-to-center distances.

In U.S. Pat. No. 3,805,397, a pair of perpendicularly oriented scales having edge engaging sliders may be utilized to find the center of circular objects. U.S. Pat. No. 4,731,931 teaches another mechanical distance measuring device utilizing a dial indicator. The basic device utilizes inside and outside calipers to which cone centering devices may be attached to permit center-to-center measurement of apertures.

More recent devices of this type include electronic digital readouts. For example, U.S. Pat. No. 4,229,883 discloses a relatively conventional hand-held caliper for taking inside and outside diameter measurements. Electronic scaling of the translation of the slider is achieved by light emitting and receiving elements which cooperate with a scale on the beam of the caliper assembly. U.S. Pat. No. 4,566,199 teaches a device similar to a conventional sliding caliper which further includes a digitally electronic readout and spring biased conical member which cooperates with either a straight edge to measure edge-to-center distances or a second cone to measure center-to-center distances between circular apertures.

U.S. Pat. No. 4,612,656 presents an inside and outside caliper apparatus having a digital readout and output port which may drive a printer or other recording device. U.S. Pat. No. 4,972,603 comprises a pair of parallel, spaced-apart rails, a measuring head having a digital readout and adjustable elements such as caliper arms and stops which adapt the device to a large number of measurement tasks.

From the foregoing review, it is apparent that improvements in he art of linear measurement devices are both possible and desirable.

SUMMARY OF THE INVENTION

A linear measurement device having a digital readout provides rapid and direct measurement of center-to-center, center-to-edge and edge-to-edge distances. The device includes an endpiece assembly secured to an elongate beam. A slider assembly is disposed on the beam for bi-directional translation therealong and includes an electronic distance measuring and readout assembly. The measuring and readout assembly is preferably battery powered and includes a plurality of controls which activate and deactivate it, zero the display, and select English or metric display units, for example. The endpiece assembly and the slider assembly each include portions of three sets of locating structures which cooperate to obtain a linear measurement by positioning the slider relative to the beam. A first set of locating structures comprises a pair of cones for locating the centers of circles and measuring therebetween. The second set of locating structures comprises a cone and a pin for measuring the distance of the center of a circle from an edge. The third set of locating structures includes two pairs of pins disposed in parallel spaced relationship for making edge-to-edge and diagonal measurements.

BRIEF DESCRIPTION OF THE DRAWINGS

FIG. 3 is a rear, elevational view of a linear measurement device according to the present invention;

FIG. 4 is a left side, elevational view of a linear measurement device according to the present invention; and FIG. 5 is an exploded perspective view of a linear measurement device according to the present invention.

DESCRIPTION OF THE PREFERRED EMBODIMENT

Figure 1:
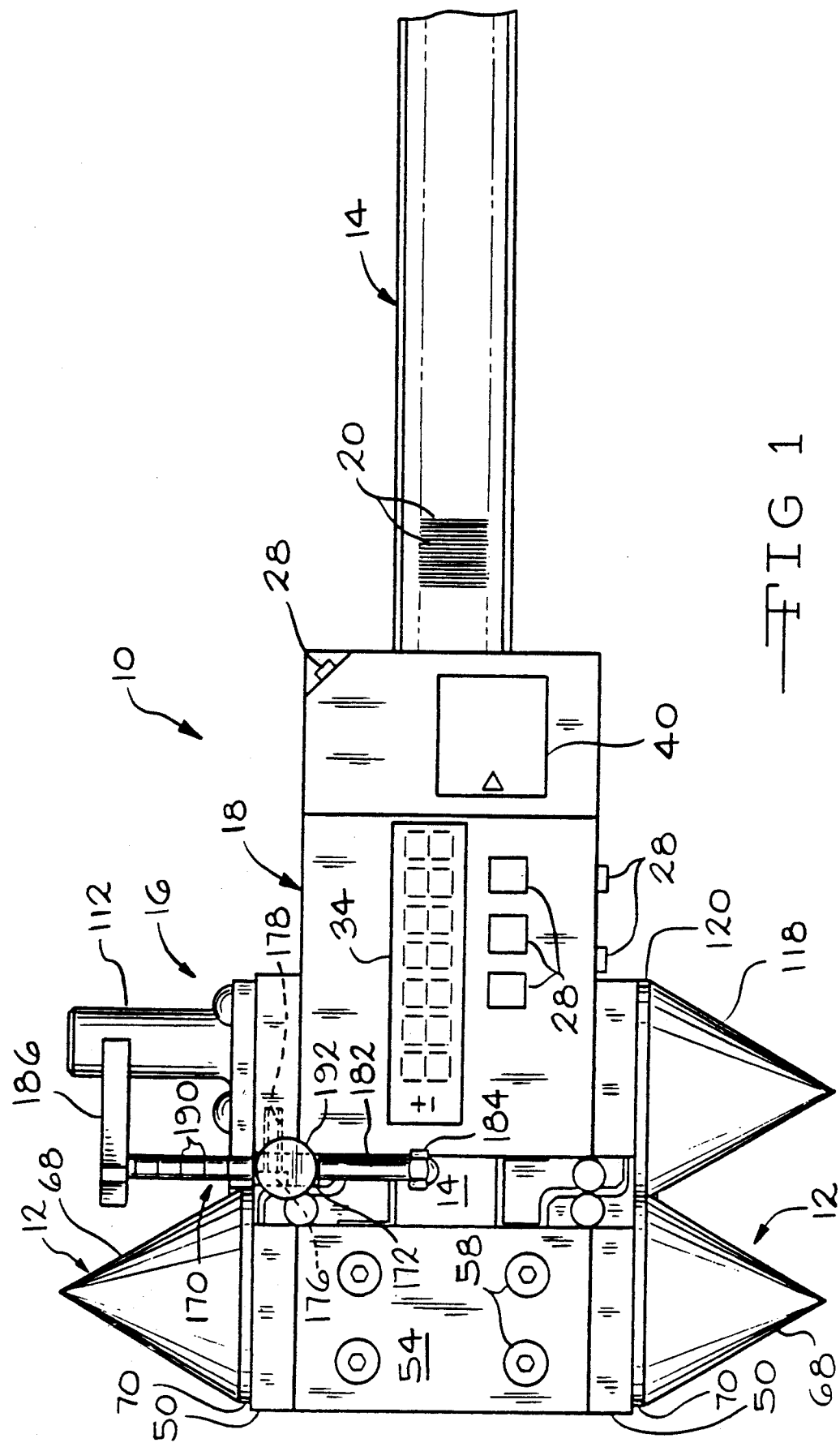
FIG. 1 is a front, elevational view of a linear measurement device according to the present invention.

Referring now to FIG. 1, a linear measurement device according to the present invention is illustrated and designated by the reference numeral 10. The linear measurement device 10 generally defines an endpiece assembly 12 which is securely coupled to an elongate beam assembly 14. Disposed for bi-axial translation on the beam assembly 14 is a slider assembly 16. The slider assembly 16 includes an electronic digital readout assembly 18.

Figure 2:
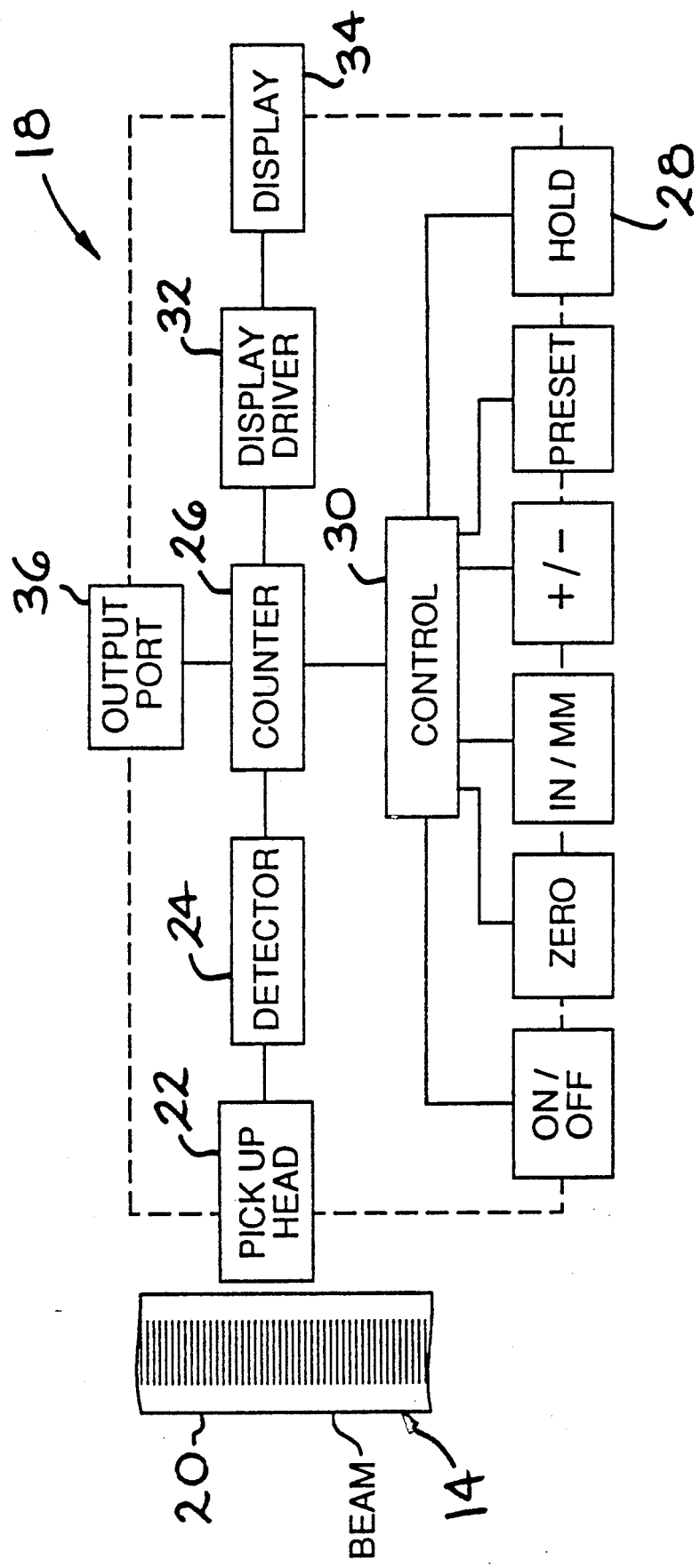
FIG. 2 is a block diagram of the electronic circuitry of a linear measurement device according to the present invention.

Turning now to FIGS. 1 and 2, the beam assembly 14 is rigid and preferably made of a stable, lightweight material such as aluminum, other metal or carbon fiber composite material and includes transverse scale markings or graduations 20 which extend along substantially the full length of the beam 14. The graduations may be visible to the naked eye, as illustrated, or may not be visible. The graduations 20 are sensed optically or magnetically by the electronic digital readout assembly 18 and specifically by a pickup head 22. The output from the pickup head 22 is provided to a detector circuit 24 which shapes the signal pulses from the pickup head 22 and provides them to an add/subtract counter 26. A plurality of momentary contact push buttons 28 permit a variety of user commands to be provided to a control circuit 30. For example, specific push buttons 28 turn the electronic assembly 18 on and off, select whether the display reads in inches or millimeters, zeroes the display, toggles between a positive and negative displayed value, provides a preset value to the display and holds the value displayed. The output of the control circuit 30 is provided to the add/subtract counter 26 and the output of the counter 26 is provided to a display driver circuit 32. In turn, the output of the display driver circuit 32 is provided to a digital display such as a multiple digit, seven segment LCD or LED display 34. The electronic digital readout assembly 18 may be like or similar to units manufactured by Mitutoyo Mfg. Co. Limited of Tokyo, Japan. Furthermore, the device may include an output port 36 which provides a data output to a printer or other component such as an outboard data storage device as illustrated in U.S. Pat. No. 4,612,656. The electronic digital readout assembly 18 is preferably powered by a small self-contained battery (not illustrated) which is retained within the electronic assembly 18 by a removable cover 40.

While an electronic assembly such as the digital readout assembly 18 provides optimum available accuracy and ease of use, it should be understood that the linear measurement device 10 of the present invention may alternatively include a simple operator readable scale, a vernier scale such as illustrated in U.S. Pat. No. 3,289,307 or a dial indicator as shown in U.S. Pat. No. 4,731,931.

Referring now to FIGS. 1, 3 and 5, the endpiece assembly 12 includes an endpiece block 50 which is generally U-shaped and defines a channel 52 having a width just slightly greater than the width of the beam assembly 14. The channel 52 receives the beam assembly 14. A clamp plate 54 extends across and beyond the edges of the beam assembly 14 and includes a plurality of through openings 56 which receive complementary threaded fasteners 58. The threaded fasteners 58 are received within a like plurality of complementarily threaded openings 60 in the endpiece block 50. The threaded fasteners 58 may be tightened to drive the clamp plate 50 against the beam assembly 14 and rigidly and securely retain the beam assembly 14 within the channel 52 of the endpiece block 50 as will be readily appreciated.

The opposite ends, that is, the top and bottom faces, of the endpiece block 50 include an aligned pair of threaded apertures 64 (one of which is illustrated in FIG. 5) which each receive a complementarily threaded hex head set screw 66 or similar component such as a threaded stud. Each of the set screws 66 extend coaxially from one of a respective pair of centering cones 68. The centering cones 68 define a sixty degree included angle as well as a narrow cylindrical surface 70 which defines the maximum diameter of the cone 68. The threaded studs 66 of the cones 68 are received within the aligned threaded apertures 64 and secure the cones 68 to the endpiece block 50 on an axis perpendicular to the longitudinal axis of the beam assembly 14.

The endpiece block 50 also defines a pair of parallel, spaced apart channels 74 which are oriented parallel to the channel 52 but on the opposite, rear face of the block 50. The channels 74 extend only partially across the rear face of the endpiece block 50 as illustrated in FIG. 5. Disposed in alignment with the pair of channels 74 are a pair of threaded apertures 76. The threaded apertures 76 are arranged such that the center axes of the apertures 76 preferably coincide with the bottom surface of the channels 74. Furthermore, a portion of each of the threaded apertures 76 extends into the region defined by the channels 74. A pair of complementarily threaded set screws 78 are received within a respective one of the pair of threaded apertures 76. The set screws 78 may be rotated and advanced axially into the region defined by the channels 74 or retracted from the channels 74.

A pair of identical measuring pin assemblies 80 each define a bracket 82 having a width just slightly less than the width of the channels 74. The brackets 82 of the measuring pin assemblies 80 are thus slidably received in the channels 74. Each of the brackets 82 securely receives and positions a register pin 84 which is and must be accurately perpendicularly oriented with respect to the axis of the beam assembly 14. The brackets 82 of the measuring pin assemblies 80 also include a forward, offset ear portion defining a work engaging surface 86 oriented perpendicularly to the axes of the register pins 84. The surface 86 engages an edge adjacent region of a workpiece to be measured as will be explained subsequently. The brackets 82 define elongate through apertures 88 which receive complementarily configured hex head cap screws 90. The cap screws 90 are, in turn, received within complementarily threaded apertures 92 in the endpiece block 50.

Referring now to FIGS. 4 and 5, the slider assembly 16 is similarly though not identically configured to the endpiece assembly 12. The slider assembly 16 includes a slider plate 100 which is generally rectangular and a pair of parallel, spaced apart ears 102 disposed perpendicularly to the plate 100 at one end. In one of the ears 102 are a plurality of threaded apertures 104 which receive complementary threaded fasteners 106. The threaded fasteners 106 extend through a like plurality of apertures 108 in a mounting plate 110 and secure the mounting plate 110 and a cylindrical pin 112 to the ear 102 of the slider plate 100. The cylindrical pin 112 defines an axis perpendicular to the axis of the beam assembly 14 and the direction of travel of the slider plate 100 along the beam assembly 14. The other of the ears 102 defines a threaded aperture 114 having an axis which is preferably coincident with the edge of the cylindrical pin 112 proximate the endpiece assembly 12. The threaded aperture 114 is preferably identical in size and thread configuration to the apertures 64 disposed in the endpiece block 50. The threaded aperture 114 receives a complementarily threaded hex head set screw 116 or similar component such as a threaded stud. The set screw 116 is a component of and axially aligned with the axis of a centering cone 118. The centering cone 118 is identical to the centering cones 68 disposed on the endpiece block 50 and likewise includes a narrow cylindrical surface 120 which defines its maximum diameter.

The slider plate 100 also defines a pair of spaced apart parallel channels 124 which extend along a portion of one face of the plate 100 generally adjacent the ears 102. The parallel channels 124 define widths and center-to-center spacing identical to that of the channels 74 in the endpiece block 50. Similarly, a pair of threaded apertures 126 are aligned with the channels 124 and further have center axes which are preferably coincident with the bottom surfaces of the channels 124. A pair of complementarily threaded set screws 128 are received within the threaded apertures 126.

A pair of pin assemblies 130 are slidably received within the channels 124. The pin assemblies 130 are identical to one another and, furthermore, identical to the pin assemblies 80 discussed above in connection with the endpiece block 50. That is, they each include a bracket 132, a register pin 134 which is and must be oriented perpendicular to the axis of the beam assembly 14, a forward offset ear portion defining a flat surface 136 and an elongate aperture 138 which receives a threaded hex head cap screw 140. The threaded cap screws 140 are received within complementarily threaded apertures 142 in the slider plate 100 and thereby secure the measuring pin assemblies 130 into one of the respective parallel channels 124 in the slider plate 100 as will be readily appreciated.

With regard to both pairs of the pin assemblies 80 and 130, fine adjustment of their individual positions in the channels 74 and 124, respectively, is accomplished by loosening the cap screws 90 and 140, respectively, and retracting or advancing the set screws 78 and 128, respectively. When the individual pin assemblies 80 and 130 are properly positioned, the cap screws 90 and 140, respectively, may be retightened to fix the positions of the pin assemblies 80 and 130, respectively, relative to the endpiece block 50 and the slider plate 100, respectively. It will be appreciated that the sliding mode of engagement between the channels 74 and the brackets 82 and the channels 124 and the brackets 132 maintains the register pins 84 and 134 respectively, perpendicular to the axis of the beam assembly 14.

The slider plate 100 also includes a plurality of through openings 150 which receive complementarily sized threaded fasteners 152 which extend into complementarily threaded apertures 154 in the electronic digital readout assembly 18. The threaded fasteners 152 secure the electronic digital readout assembly 18 to the slider block 100 as will be readily appreciated. The beam assembly 14 is slidably received within a complementarily configured through passageway 156 in the electronic readout assembly 18. A pair of unthreaded clearance openings 158 receive a pair of threaded set screws 160 which extend into a pair of complementarily threaded openings 162 in the housing of the electronic digital readout assembly 18. The openings 162 open into the through passageway 156 and align with the back of the beam assembly 14. A pair of resilient solid washers 164 of, for example, polyurethane, are aligned with the ends of the set screws 160 and contact the back of the beam assembly 14. By advancing or retracting the set screws 160, friction between the slider block 100 and the beam assembly 14 can be adjusted to provide appropriate sliding action and thus suitable operation of the slider assembly 16 on the beam assembly 14.

The slider assembly 16 of the linear measurement device 10 includes a compensation assembly 170. When center-to-edge distance measurements are performed, the most accurate measurement will be obtained when the linear measurement device 10 and specifically the beam assembly 14 is disposed parallel to the workpiece surface defining the features to be measured. Lack of parallelism will result in a measurement which, in effect, is a diagonal rather than true measurement. The compensation assembly 170 includes a mounting block 172 which includes a plurality of through openings. A first through opening 174 receives a threaded fastener 176 which, in turn, is received within a complementarily threaded opening 178 in the ear 102 of the slider block 100 adjacent the cylindrical pin 112. A second through opening 180 in the mounting block 172 receives a graduated rod 182. A cap or acorn nut 184 upon one end of the graduated rod 182 and a perpendicularly oriented pad or arm 186 secured to the other end renders the rod 182 captive within the mounting block 172. The arm 186 includes a concave recess 188 having a curvature complementary to the exterior surface of the cylindrical pin 112 which it engages. The graduated rod 182 includes a plurality of markings or graduations 190 disposed in spaced relationship therealong. A threaded thumb screw 192 is received within a complementarily threaded passageway 194 in the mounting block 172. The threaded passageway 194 intersects the second through opening 180 which receives the graduated rod 182. The thumb screw 192 may be tightened to secure the rod 182 and the arm 186 in a given position or loosened to reposition it as will be readily appreciated.

Preferably, the spacings between the graduations 190 on the graduated rod 182 represent one eighth inch increments in the dimension of the aperture into which the centering cone 68 adjacent the cylindrical pin 112 will be placed. When the diameter of the aperture into which the centering cone 68 is to be placed is approximately one eighth of an inch, the first graduation 190 is aligned with the edge of the mounting block 172 such that the graduated rod 182 extends substantially its maximum length from the mounting block 172. When the pad or arm 186 engages the workpiece surface during a center-to-edge measurement, the linear measurement device 10 will be substantially parallel to the workpiece, ensuring an accurate measurement. With each approximately one eighth inch increase in the diameter of the measured aperture, the graduated rod 182 may be moved inward, into the mounting block 172 one graduation 190. The graduations 190 thus serve as an approximate guide to positioning the arm 186 in order to ensure that the linear measurement device 10, and specifically the beam assembly 14, is maintained parallel to the surface of the workpiece which defines the features which are to be measured when a center-to-edge measurement is to be taken. Whenever inspection of the device 10 on the workpiece reveals that parallelism therebetween has not been achieved through the use of the approximation provided by the graduations 190 on the rod 182 as described above, the thumb screw 192 may be loosened and the arm 186 adjusted to achieve parallelism. The thumb screw 192 may then be retightened.

The operation of the linear measurement device 10 will now be described. At the outset, it should be understood that the various pairs of measuring devices, that is, the lower one of the pair of cones 68 and the cone 118 which are utilized to provide center-to-center distances between circular apertures, the upper or other one of the cones 68 and the mounting plate 110 of cylindrical pin 112 which are utilized to take distance measurements from the edge of a workpiece to the center of an aperture and the pairs of pins 84 and 134 which are utilized to provide edge-to-edge distance measurements are preferably all in respective contact when the slider assembly 16 is fully to the left, against the endpiece assembly 12, as illustrated in FIG. 1.

To find the center-to-center distance between two circular apertures, neither of which is larger than the maximum diameter of the cones 68 and 118, the electronic digital readout assembly 18 is activated by pushing the on/off push button 28, the slider assembly 16 is translated fully to the left, as illustrated in FIG. 1, the zero push button 28 is depressed and the preset push button 28 is also depressed. The value entered by the preset push button 28 will be that value which represents the center-to-center separation of the lower cone 68 and the cone 118 when positioned as illustrated in FIG. 1. The lower cone 68 is snugly positioned within one of the apertures in the workpiece (not illustrated)

and the slider assembly 16 is moved until the cone 118 is similarly snugly received within the other aperture in the workpiece. The center-to-center distance between the apertures will now be displayed on the display 34.

To achieve a center-to-edge measurement, the process is similar. The preset value maintained in the memory of the control circuitry 30 is again recalled to display the offset between the center of the upper cone 68 and the more proximate edge of the cylindrical pin 112 which is preferably the same as the center-to-center distance between the cones 68 and 118. This, of course, is done when the slider assembly 16 is positioned against the endpiece assembly 12 as illustrated in FIG. 1. Next, the compensation assembly 170 is adjusted as described above. Then, the slider assembly 16 is moved away from the endpiece assembly 12 such that the upper cone 68 snugly seats within the aperture, the cylindrical pin 112 is placed against the edge of the workpiece and the arm 186 rests against the surface of the workpiece so that the beam assembly 14 is parallel to the surface of the workpiece. The smallest displayed value is the actual dimension inasmuch as higher values indicate that a diagonal distance rather than the true perpendicular distance is being measured.

To measure edge-to-edge distances, the slider assembly 16 is moved into contact with the endpiece assembly 12 and the electronic digital readout assembly 18 is zeroed by pressing the appropriate push button 28. Then, the slider assembly 16 is moved away from the endpiece assembly 12 until the pairs of pins 84 and 134 engage the outer edges of the workpiece to be measured. Contact with the workpiece by the pairs of pins 84 and 134 ensure that the measurement is taken as a true perpendicular between the edges of the workpiece. The number appearing in the display 34 is the actual edge-to-edge measurement of the workpiece.

Other measurements may be made such as the length of a tube or bar in which only two of the pins, that is, one of the pair of pins 84 and one of the pair of pins 134 may engage the workpiece. The measurement procedure is the same as the edge-to-edge operation described directly above. That is, once the electronic digital readout assembly 18 is zeroed and the slider assembly 16 moved appropriately, the measurement will be displayed. Of course, two aligned pins 84 and 134, not diagonally opposed pins, must be used to achieve this measurement. Similarly, the diameter or width of a round or polygonal object may be measured in the same manner as the edge-to-edge measurement. Again, a pair of aligned register pins 84 and 134, not diagonally opposed pins, must be used to make the measurement.

Inside edge to inside edge measurements on a workpiece may also be made, i.e., a measurement of, for example, the width and length of a rectangular cutout in a workpiece. In this case, since the register pins are disposed within the cutout, the measurement is reduced, i.e., is lower than the actual measurement, by the sum of the diameters of one of each of the register pins 84 and 134. Accordingly, this sum of the diameters must be added to the value displayed in the digital display 34. Somewhat similarly, the distance between an outside edge of a workpiece and an inside edge of a cutout or aperture may be measured. In this case, only the diameter of one of the pairs of register pins, either the pins 84 or the pins 134 which are disposed in the cutout are being measured. Accordingly, the diameter of the pins 84 or 134 located within the cutout must be known and this value added to the value appearing in the display 34.

Finally, the linear measurement device 10 facilitates the checking of squareness of a sheet of material or workpiece. This is achieved by first measuring one diagonal of the sheet and then measuring the second diagonal. The measurement technique is the same as described above with regard to edge-to-edge distances. However, after the first measurement is made, the zero push button 28 is depressed to zero the display 34. When the second measurement is made, if the two diagonals are equal, the number displayed in the display 34 will be zero. If the number appearing in the display 34 is positive, it indicates that the second diagonal is longer by the displayed distance. If the number displayed is negative, it indicates that the second diagonal is shorter by the displayed distance.

It will be apparent that the linear measurement device 10 according to the instant invention provides a versatile device for rapidly, accurately and repeatedly making linear measurements on a wide variety of features and configurations of a workpiece.

The foregoing disclosure is the best mode devised by the inventor for practicing this invention. It is apparent, however, that devices incorporating modifications and variations will be obvious to one skilled in the art of measurement devices. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A linear measurement device comprising, in combination,
    an elongate beam,
    an endpiece coupled to said elongate beam,
    a slider disposed on said beam for bi-directional translation therealong,
    means on said slider for providing a distance measurement related to movement of said slider along said beam, and
    a plurality of paired means for engaging a workpiece including
    first paired means including two cones for measuring center-to-center distances,
    second paired means including a cone and a pin for measuring center-to-edge distances and
    third paired means including two pairs of parallel, spaced-apart pins for measuring edge-to-edge distances,
    one half of each of said paired means disposed on said endpiece and the other half of each of said paired means disposed on said slider.

2. The linear measurement device of claim 1 wherein said distance measurement means is an electronic device having a digital readout.

3. The linear measurement device of claim 1 further including means for adjusting the positions of said third paired means relative to said endpiece and said slider, respectively.

4. The linear measurement device of claim 1 wherein said third paired means further includes work engaging surfaces disposed perpendicularly to and adjacent said two pairs of pins.

5. The linear measurement device of claim 1 wherein said first and said third paired means are in contact when said slider is disposed against said endpiece.

6. The linear measurement device of claim 1 further including resilient means operably disposed between said slider and said elongate beam for adjusting the friction therebetween.

7. The linear measurement device of claim 1 wherein said cones define included angles of 60°.

8. The linear measurement device of claim 1 wherein said beam includes graduations disposed therealong which cooperate with said distance measurement means to provide such measurement.

9. The linear measurement device of claim 1 wherein the center-to-center distance between the axes of said two cones is equal to the distance between the axis of said cone and a curved workpiece engaging surface of said pin.

10. The linear measurement device of claim 1 further including means for providing an adjustable workpiece engaging surface adjacent said pin of said second paired means.

11. A linear measurement device comprising, in combination,
 an elongate beam having measurement graduations disposed therealong,
 an endpiece secured to said elongate beam,
 a slider disposed on said beam for bi-directional translation therealong,
 electronic means coupled to said slider for sensing said measurement graduations and providing a distance measurement, and
 two sets of means for engaging a workpiece including
 a first set of said means including a cone and a pin for measuring center-to-edge distances and
 a second set of said means including two pairs of pins for measuring edge-to-edge distances,
 one half of each of said sets of means disposed on said endpiece and the other half of each of said sets of means disposed on said slider.

12. The linear measurement device of claim 11 further including a third set of said means including two cones for measuring center-to-center distances of circular features.

13. The linear measurement device of claim 11 wherein said second set of means further includes work engaging surfaces disposed perpendicularly to and adjacent said pins.

14. The linear measurement device of claim 11 wherein said second pair of means further includes means for adjusting the positions of said pins relative to said endpiece and said slider, respectively.

15. The linear measurement device of claim 11 further including means for providing an adjustable workpiece engaging surface adjacent said pin of said second paired means.

16. A linear measurement device comprising, in combination,
 an elongate beam,
 an endpiece on said elongate beam,
 a slider disposed on said beam for bi-directional translating therealong,
 electronic means on said slider for cooperating with said beam and providing a linear measurement, and
 first paired means including a cone and a pin having a curved workpiece engaging surface for measuring center-to-edge distances, one of said first paired means disposed on said endpiece and the other of said first paired means disposed on said slider,
 second paired means including two pairs of parallel pins for measuring edge-to-edge distances, one of said second paired means disposed on said endpiece and the other of said second paired means disposed on said slider.

17. The linear measurement device of claim 16 further including third paired means including two cones for measuring center-to-center distances, one of said third paired means disposed on said endpiece and the other of said third paired means disposed on said slider.

18. The linear measurement device of claim 16 wherein said electronic means for providing a linear measurement has a digital readout and said elongate beam includes graduations disposed therealong sensed by said electronic device.

19. The linear measurement device of claim 16 further including means for adjusting the positions of said first pair of pins relative to said endpiece and said second pair of pins relative to said slider.

20. The linear measurement device of claim 19 wherein said adjusting means includes a bracket for receiving one of said pins, an elongate slot in said bracket, a threaded fastener extending through said slot and a threaded adjustment screw abutting said bracket.

21. A linear measurement device comprising, in combination,
 an elongate beam having distance measuring graduations disposed therealong,
 an endpiece coupled to said elongate beam,
 a slider disposed on said beam for bi-directional translation therealong,
 electronic means on said slider for cooperating with said graduations and providing a distance measurement, and
 two sets of means for engaging features of a workpiece selected from the group consisting of
 a pair of cones for measuring center-to-center distances,
 a cone and a cylindrical pin for measuring center-to-edge distances and
 first and second pairs of pins for measuring edge-to-edge distances,
 one of each of said sets of means disposed on said endpiece and the other of each of said sets of means disposed on said slider.

22. The linear measurement device of claim 21 wherein said distance measurement means has a digital readout.

* * * * *